US012643646B2

(12) United States Patent
Ross

(10) Patent No.: US 12,643,646 B2
(45) Date of Patent: Jun. 2, 2026

(54) WEED DEFLECTION DEVICE

(71) Applicant: Don Ross, Chardon, OH (US)

(72) Inventor: Don Ross, Chardon, OH (US)

( * ) Notice: Subject to any disclaimer, the term of this patent is extended or adjusted under 35 U.S.C. 154(b) by 456 days.

(21) Appl. No.: 18/370,549

(22) Filed: Sep. 20, 2023

(65) Prior Publication Data

US 2025/0091701 A1     Mar. 20, 2025

(51) Int. Cl.
| | |
|---|---|
| *B63H 5/16* | (2006.01) |
| *A01M 21/02* | (2006.01) |
| *B63H 20/00* | (2006.01) |

(52) U.S. Cl.
CPC ........... B63H 5/165 (2013.01); B63H 20/007 (2013.01); *A01M 21/02* (2013.01)

(58) Field of Classification Search
CPC ...... B63H 20/00; B63H 20/007; B63H 20/34; B63H 5/00; B63H 5/07; B63H 5/16; B63H 5/165; A01M 21/00; A01G 3/00
USPC ...................................................... 440/71, 73
See application file for complete search history.

(56) References Cited

U.S. PATENT DOCUMENTS

| | | | | |
|---|---|---|---|---|
| 2,894,477 A | * | 7/1959 | Brown ................... | B63H 5/165 |
| | | | | 440/71 |
| 3,802,377 A | * | 4/1974 | Porter ................... | B63H 5/165 |
| | | | | 440/72 |
| 3,859,953 A | * | 1/1975 | Todt ....................... | B63H 5/165 |
| | | | | 440/72 |
| 4,013,033 A | * | 3/1977 | Porter .................... | B63H 5/165 |
| | | | | 440/72 |
| 4,070,984 A | * | 1/1978 | Kappas .................. | B63H 5/165 |
| | | | | 440/72 |
| 4,224,893 A | * | 9/1980 | Vollmar ............... | B63H 20/007 |
| | | | | 440/73 |
| 4,925,412 A | * | 5/1990 | Karls ..................... | B63H 5/165 |
| | | | | 440/73 |
| 5,993,274 A | * | 11/1999 | Rising .................... | B63H 25/42 |
| | | | | 440/71 |
| 7,488,226 B2 | * | 2/2009 | Perkins, II ........... | B63H 20/007 |
| | | | | 440/71 |
| 2005/0142958 A1 | * | 6/2005 | Garcia ................... | B63H 11/01 |
| | | | | 440/71 |

* cited by examiner

*Primary Examiner* — Daniel V Venne
(74) *Attorney, Agent, or Firm* — McDonald Hopkins LLC

(57) ABSTRACT

Disclosed herein is a deflection device for a trolling motor assembly that deflects aquatic vegetation and other waterborne debris. The deflection device includes a deflector plate disposed on one side of a down shaft of the trolling motor and a cutting member disposed on an opposite side. The deflector plate includes a bottom edge, an oblique front edge, a rear edge, a first and second angled leg that each extend outward from the rear edge, and a top edge. The cutting member includes at least one cutting edge disposed adjacent to a location where a propeller of the trolling motor is mounted.

20 Claims, 5 Drawing Sheets

WEED DEFLECTION DEVICE

BACKGROUND

The present specification generally relates to trolling motors, and in particular, to devices that are integrally formed on or otherwise attached to trolling motors which deflect aquatic vegetation and other waterborne debris away from components of these trolling motors.

It is a frequent occurrence when fishing with the aid of a trolling motor that aquatic vegetation and other waterborne debris engage around the connection shaft of the trolling motor and, under the influence of the forward motion of the boat, will oftentimes follow the connection shaft downwardly to the motor and propeller. In addition to affecting motor performance, clearing this aquatic vegetation or debris from the connection shaft and/or propeller of the trolling motor presents a common time wasting nuisance to anglers. Existing solutions for deflecting aquatic vegetation or debris away from the connection shaft and propeller of trolling motors have been overly complex, expensive, and/or difficult to produce or install. Moreover, existing solutions have been tailored to fit specific trolling motor makes and models.

Accordingly, a need exists for a device that adequately deflects or mitigates aquatic vegetation and other waterborne debris away from the connection shaft and propeller of trolling motors, but which may also be readily attachable to or formable with various makes and models of trolling motors, while being simple and inexpensive to produce, and easily formed or installed.

SUMMARY

In one embodiment, a device for a trolling motor includes a deflector plate disposed on one side of a down shaft of the trolling motor, the deflector plate including a bottom edge that extends forwardly from the down shaft, an oblique front edge that extends forwardly and upwardly from one end of the bottom edge, a rear edge that extends upwardly from an opposite end of the bottom edge, a first angled leg that extends outward from the rear edge toward the down shaft in one direction, a second angled leg that extends outward from the rear edge toward the down shaft in another direction, and a top edge that extends between the oblique front edge and the rear edge; and a cutting member disposed on an opposite side of the down shaft, the cutting member including at least one cutting edge disposed adjacent to a location where a propeller of the trolling motor is mounted.

In another embodiment, a trolling motor includes a motor unit disposed on a lower end of a down shaft, wherein the motor unit includes a propeller and a motor housing with a nose piece and a tail piece; a deflector plate disposed on one side of the down shaft above the nose piece, the deflector plate including a bottom edge that extends forwardly from the down shaft, an oblique front edge that extends forwardly and upwardly from one end of the bottom edge, a rear edge that extends upwardly from an opposite end of the bottom edge, a first angled leg that extends outward from the rear edge toward the down shaft in one direction, a second angled leg that extends outward from the rear edge toward the down shaft in another direction, and a top edge that extends between the oblique front edge and the rear edge; and a cutting member disposed on an opposite side of the down shaft above the tail piece, the cutting member including at least one cutting edge disposed adjacent to a location on the tail piece where the propeller is mounted.

In yet another embodiment, a device for a trolling motor includes a bracket with a first part disposed on one side of a down shaft and a second part disposed on an opposite side of the down shaft, the first part being coupled to the second part such that the down shaft is disposed between the first and second parts; a deflector plate mounted on the first part of the bracket, the deflector plate including a bottom frame member that extends forwardly from the first part of the bracket, a front frame member that extends obliquely upward from one end of the bottom frame member, a V-shaped rear frame member that extends upward from an opposite end of the bottom frame member, and a wall that extends between the bottom, front, and V-shaped rear frame members; and a cutting member mounted on the second part of the bracket, the cutting member including at least one blade disposed adjacent to a location where a propeller of the trolling motor is mounted.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and/or exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
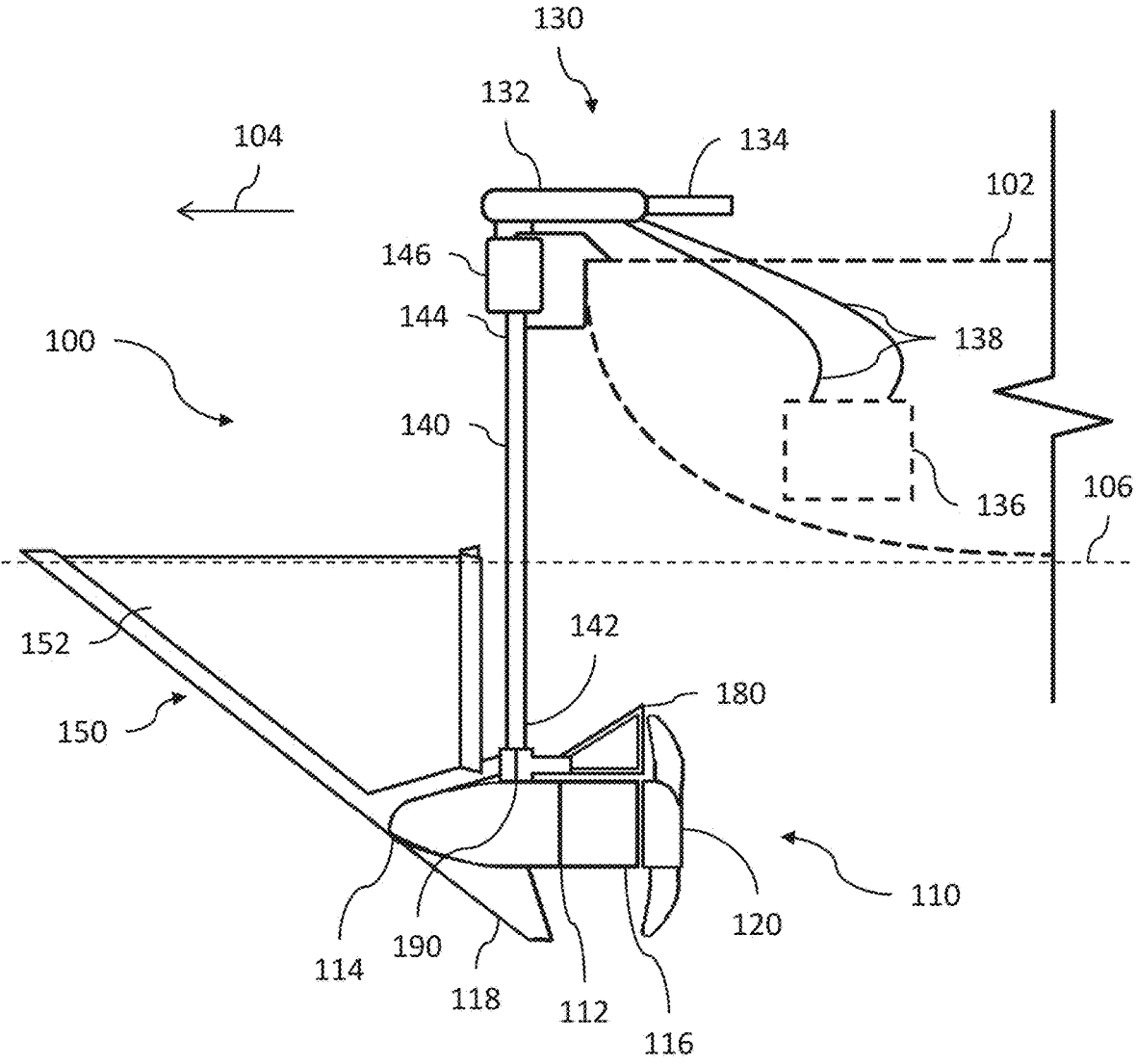
FIG. 1 schematically depicts an environment in which a trolling motor is mounted on a boat and includes a weed deflection device, according to one or more embodiments shown and described herein.

Embodiments described herein are directed to a weed deflection or mitigation device for a trolling motor and/or a trolling motor formed with or otherwise including a weed deflection or mitigation device. The weed deflection device generally includes a deflector plate disposed on one side of a down shaft of a trolling motor and a cutting member disposed on an opposite side of the down shaft. Various embodiments of the weed deflection device and/or trolling motor including the weed deflection device are described in more detail herein. Whenever possible, the same reference numerals will be used throughout the drawings to refer to the same or like parts. While the specification and embodiments disclosed herein are directed to "weed deflection," it is to be understood that the devices included herein can be employed to deflect, mitigate or other remediate accumulation of weeds, debris, vegetation or other objects that may otherwise gather upon a motor or motor shaft. These alternative embodiments are to be included within the spirit and/or scope of the innovation and claims appended hereto.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As shown in FIG. 1, a trolling motor assembly 100 is mounted to a boat 102 such that the boat 102 can be propelled forward in the direction of arrow 104 on or below a waterline 106. The trolling motor assembly 100 generally includes a motor unit 110 with propeller 120, a control unit 130, and a down shaft 140 extending between the motor unit 110 and the control unit 130.

In accordance with embodiments disclosed herein, a weed deflection device 150 is also illustrated in FIG. 1 that is generally disposed above the motor unit 110 and generally includes a deflector plate 152, a cutting member 180, and an optional bracket 190. Furthermore, while the weed deflection device 150 is named/referred to as deflecting weeds, it should be understood that the weed deflection device 150 is generally configured to deflect any type of aquatic vegetation or other waterborne debris (e.g., sticks, logs, trash, fishing line, etc.). Further, while a cutting member (e.g., 180) is illustrated, it is to be understood that embodiments can exist without this feature/member. These alternate embodiments are to be included within the spirit and scope of the innovation described and claimed herein.

In this embodiment, the motor unit 110 is disposed on a lower end 142 of the down shaft 140 such the motor unit 110 is submerged below the waterline 106. The motor unit 110 generally includes a motor housing 112 with a first end or nose piece 114, a second end or tail piece 116 disposed behind the nose piece 114, a skeg 118 mounted to the bottom of the motor housing 112, and a propeller 120 mounted to a rotor shaft (not shown) behind the tail piece 116. A D.C. (direct current) motor (not shown) disposed within housing 112 drives the propeller 120. While the motor described is a D.C. motor, it is to be appreciated that alternative motors can be equipped with the mitigation devices described herein without departing from the spirit and scope of the innovation. In other words, fuel-powered, solar-powered, etc. motors can be used in alternative aspect—all of which are to be included within the scope of this specification.

The control unit 130 is disposed on an upper end 144 of the down shaft 140 and generally includes a control housing 132 with a steering handle 134. A battery 136 supplies power via electric leads 138 for energizing the control unit 132 and the motor of the motor unit 110 in a well-known matter. The applied power may be modulated with the control unit 130 for controlling the speed of the motor, although for trolling, a slow, steady boat speed is generally desired.

In the illustrated aspect, a mount 146 is disposed between the lower and upper ends 142, 144 of the down shaft 140 for mounting the trolling motor 100 to the boat 102 in a well-known manner. The mount 146 may permit rotation of the down shaft 140 relative to the boat for steering. The mount 146 may also permit upward and downward movement of the down shaft 140 such that the position of the motor unit 110 and weed deflection device 150 can be adjusted with respect to the waterline 106. Furthermore, the mount 146 may permit pivoting of the down shaft 140 such that the motor unit 110 and weed deflection device 150 can be raised above and below the waterline 106. In some embodiments, the mount 146 may attach the trolling motor 100 to the bow of the boat 102. In other embodiments, as discussed in further detail below, the mount 146 may attach the trolling motor 100 to the transom or stern of the boat 102.

Figure 2:
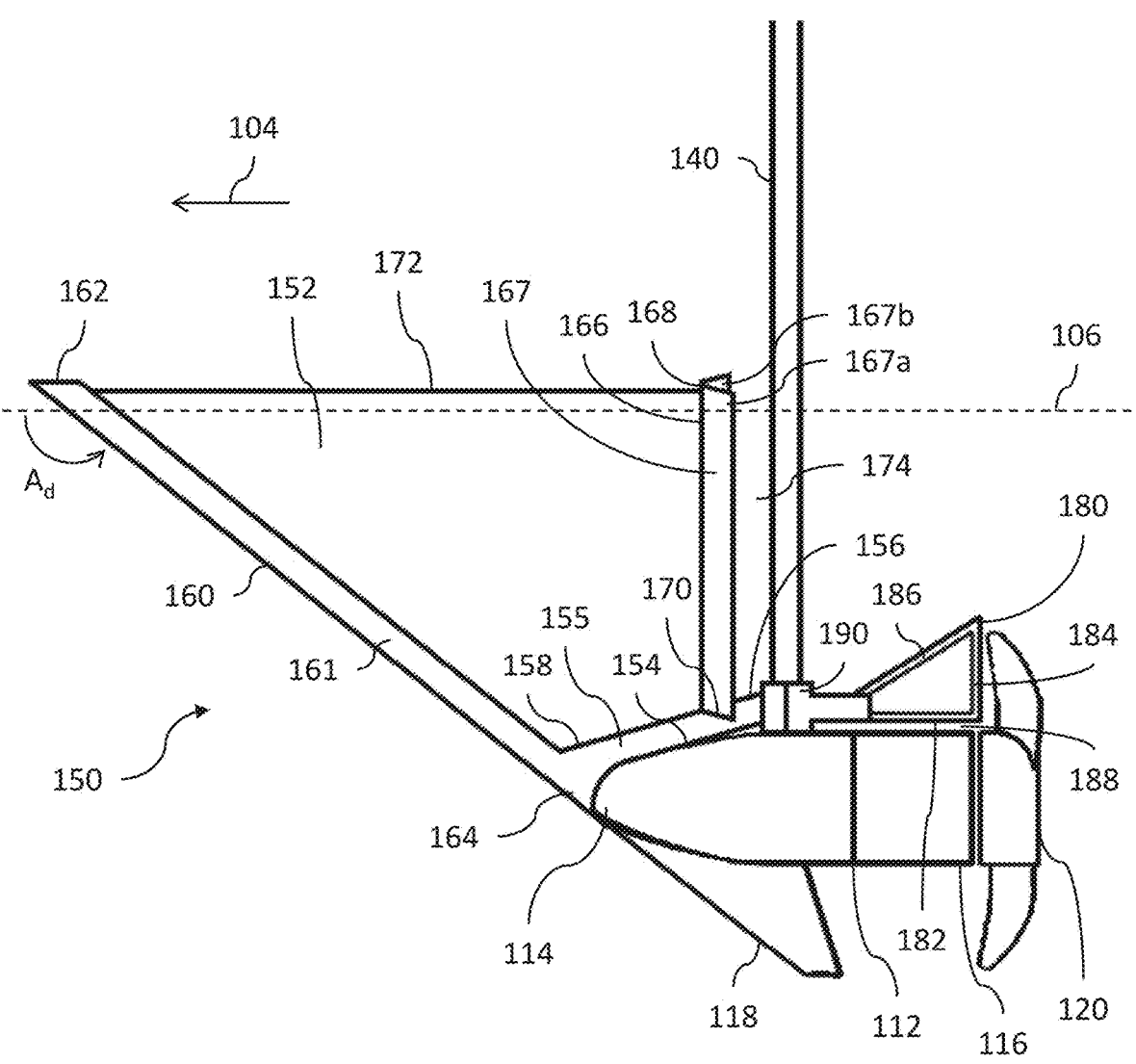
FIG. 2 schematically depicts a weed deflection device that includes a deflector plate and a cutting member, according to one or more embodiments shown and described herein.
Figure 3:
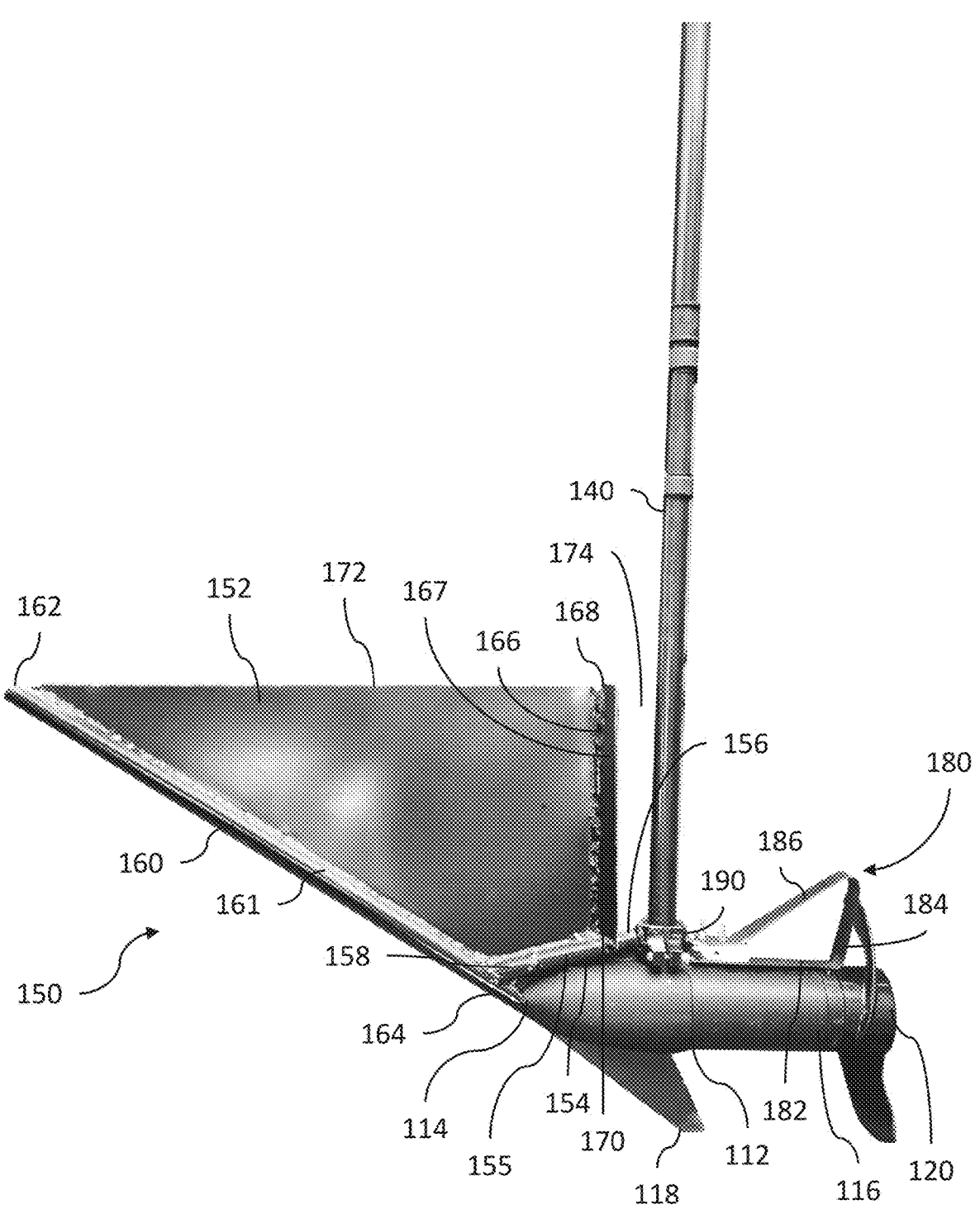
FIG. 3 depicts the weed deflection device of FIG. 2, according to one or more embodiments shown and described herein.

The weed deflection device 150 is illustrated in greater detail with reference to FIGS. 2 and 3. The weed deflection device 150 is disposed on the lower end 142 of the shaft 140 and generally sits above the motor unit 110. The deflector plate 152 of the weed deflection device 150 is disposed on one side of the down shaft 140 and sits generally above the nose piece 114. The cutting member 180 of the weed deflection device 150 is disposed on an opposite side of the down shaft 140 and sits generally above the tail piece 116.

The deflector plate 152 is generally configured as a planar member or wall that extends between a bottom edge 154, an oblique front edge 160, a rear edge 166, and an upper edge 172. In some embodiments, a bottom frame member 155 defines the bottom edge 154, a front frame member 161 defines the oblique front edge 160, and a first and second angled leg 167a, 167b create a V-shape that defines the rear edge 166. Collectively, the first and second angled legs 167a, 167b may be referred to as a V-shaped rear frame member 167. While not shown and likely not performance optimal, other embodiments can exist without the deflector plate 152.

The bottom edge 154 or frame member 155 extends forwardly with respect to the down shaft 140 in the direction of arrow 104 between a first end 156 and a second end 158. The bottom edge 154 or frame member 155 is disposed on or about the top of the nose piece 114. In some embodiments, the bottom edge 154 or frame member 155 may be straight, while in other embodiments the bottom edge 154 or frame member 155 may be contoured to match an outer peripheral surface of the nose piece 114. For example, the nose piece 114 may have a generally conical shape and the bottom edge 154 or frame member 155 may be contoured to follow the curve of the conical shape. In this regard, by matching the contour of the bottom edge 154 or frame member 155 to the outer peripheral surface of the nose piece 114, gaps between the bottom edge 154 and outer peripheral surface of the nose piece 114 are eliminated or minimized. As such, the chance of aquatic vegetation or other waterborne debris becoming stuck between the bottom edge 154 or frame member 155 and the nose piece 114 is reduced.

The oblique front edge 160 or frame member 161 extends forwardly and upwardly toward the waterline 106 from the second end 158 of the bottom edge 154 or frame member 155. A first end 162 of the oblique front edge 160 or frame member 161 is generally configured to be positioned above the waterline 106 during operation of the trolling motor assembly 100. A second end 164 of the oblique front edge 160 or frame member 161 is disposed generally adjacent to the second end 158 of the bottom edge 154 or frame member 155 and terminates at (or about) a tip of the nose piece 114. Similar to the bottom edge 154 or frame member 155, the second end 164 of the oblique front edge 160 or frame member 161 may be contoured to match an outer peripheral surface of the tip of the nose piece 114. In other words, the second end 164 of the oblique front edge 160 or frame member 161 hooks or caps over the tip of the nose piece 114 to assist in preventing the deflector plate 152 from being pushed or bent in an upward, downward, and/or side-to-side direction during operation of the weed deflection device 150.

As discussed above, the bottom edge 154 or frame member 155 and the second end 164 of the oblique front edge 160 or frame member 161 may be contoured to follow the curve of the conical shape of the nose piece 114. In some embodiments, however, the nose piece 114 may not be conical in shape. For example, the nose piece 114, and more particularly the tip of the nose piece 114, may have the shape of a sphere, pyramid, triangular prism, or other geometric shape. In this regard, it should be understood that the bottom edge 154 or frame member 155 and the second end 164 of the oblique front edge 160 or frame member 161 may be contoured to match any geometric shape of the nose piece 114 to accommodate varied configurations of the motor unit 110. As such, the bottom edge 154 or frame member 155 and the second end 164 of the oblique front edge 160 or frame member 161 can continue to function as described above regardless of the shape of the nose piece 114. Moreover, in some embodiments, the bottom edge 154 or frame member 155 and the second end 164 of the oblique front edge 160 or frame member 161 may be configured to be removable and/or replaceable such that the weed deflection device 150 can be mounted to different motor units 110 having the varied configurations previously described.

The oblique front edge 160 or frame member 161 is generally configured to make first contact with aquatic vegetation or other waterborne debris that may be in the path of the trolling motor 100 and deflect the aquatic vegetation or other waterborne debris outward and/or down and away from the propeller 120. In this regard, the oblique front edge 160 or frame member 161 may be rounded to facilitate the deflection of the aquatic vegetation or other waterborne debris and prevent the same from becoming stuck on the oblique front edge 160 or frame member 161. In addition, a front edge of the skeg 118 may extend generally parallel to the oblique front edge 160 or frame member 161 of the deflector plate 152. Furthermore, the skeg 118 may be positioned on the motor housing 112 below the nose piece 114 such that the front edge of the skeg 118 and the oblique front edge 160 or frame member 161 of the deflector plate 152 form a generally continuous line or edge of deflection that extends from the first end 162 of the oblique front edge 160 or frame member 161 to the bottom of the skeg 118.

The rear edge 166 or frame member 167 extends upwardly from the first end 156 of the bottom edge 154 or frame member 155 toward the waterline 106. In some embodiments, the rear edge 166 extends parallel to the down shaft 140. A first end 168 of the rear edge 166 is generally configured to be positioned above the waterline 106 during operation of the trolling motor assembly 100. A second end 170 of the rear edge 166 is disposed generally adjacent to the first end 156 of the bottom edge 154 or frame member 155. A first angled leg 167a extends outward from the rear edge 166 toward the down shaft 140 in one direction, and a second angled leg 167b extends outward from the rear edge 166 toward the down shaft 140 in another direction which generally mirrors the direction of the first angled leg 167a. The first and second angled legs 167a, 167b are connected together at the rear edge 166 and can define a V-shape or V-shaped rear frame member 167, where an open side of the V-shape faces the down shaft 140 and a closed side of the V-shape faces the oblique front edge 160.

The V-shaped rear edge 166 or frame member 167 defined by the first and second angled legs 167a, 167b is generally configured to deflect aquatic vegetation or other waterborne debris outward and away from the down shaft 140. Moreover, the V-shaped rear edge 166 or frame member 167 is horizontally spaced from the down shaft 140 to define a gap 174 between the rear edge 166 or frame member 167 and the down shaft 140. The gap 174 is generally sized such that the boat mount 146 can be accommodated within the gap 174 when the position of the down shaft 140 is adjusted as described above. In this regard, the V-shaped rear edge 166 or frame member 167 is also generally configured to deflect aquatic vegetation or other waterborne debris outward and away from the gap 174.

The cutting member 180 of the weed deflection device 150 is disposed on a side of the down shaft 140 that is opposite to the side on which the deflector plate 152 is disposed. In other words, the cutting member 180 is generally disposed adjacent to a location where the propeller 120 is mounted. The cutting member 180 generally includes at least one blade 182, 184, and/or 186, which provides a cutting edge for cutting off aquatic vegetation or other waterborne debris which becomes entangled with the propeller 120. The at least one blade 182, 184, or 186 is connected to or otherwise extends from the down shaft 140 or the tail piece 116 of the motor housing 112 such that at least one cutting edge is disposed generally adjacent to a location where the propeller 120 is mounted.

In some embodiments, the cutting member 180 includes a first blade 182 that extends horizontally from the down shaft 140 to define a horizontal cutting edge, a second blade 184 that extends upwardly from the first blade 182 or horizontal cutting edge to define an upward cutting edge, and a third blade 186 that extends obliquely downward from the second blade 184 or upward cutting edge to define an oblique cutting edge. While the cutting edges of the first, second, and third blades 182, 184, 186 are shown and described with reference to one side of the cutting member 180, it should be understood that the opposite side of the cutting member 180 may include similar cutting edges.

A vertex between the first blade 182 or horizontal cutting edge and the third blade 186 or oblique cutting edge is generally attached or formed to the down shaft 140 such that a gap 188 is defined between the first blade 182 or horizontal cutting edge and the tail piece 116 of the motor housing 112. A vertex between the first blade 182 or horizontal cutting edge and the second blade 184 or upward cutting edge is generally disposed adjacent to the interface of the tail piece 116 and the propeller 120. That is, the first blade 182 or horizontal cutting edge extends beyond the tail piece 116 to at least partially overlap the seam between the tail piece 116 and the propeller 120. A vertex between the second blade 184 or upward cutting edge and the third blade 186 or oblique cutting edge is generally disposed beyond the maximum outer diameter of the propeller. That is, the vertex between the second and third blades 184, 186 sits above the outer-most point of the fins of the propeller 120.

The first, second, and third blades 182, 184, 186 being disposed as discussed above are thus positioned adjacent to the propeller 120 such that most any aquatic vegetation or other waterborne debris which is not deflected by the bottom edge 154, oblique front edge 160, or rear edge 166 of the deflector plate 152 and which may become entangled by the propeller 120 can be cut off by the cutting member 180. That is, the rotational force of the propeller 120 acts on aquatic vegetation or other waterborne debris entangled by the propeller 120 and forces the aquatic vegetation or other waterborne debris against at least one of the cutting edges defined by the first, second, and third blades 182, 184, 186, thereby cutting the aquatic vegetation or other waterborne debris and preventing the same from becoming further entangled with the propeller 120. For example, aquatic vegetation and other waterborne debris are prevented from becoming further entangled with the seam between the tail piece 116 and propeller 120 due to the at least partial overlap of the first blade 182 or horizontal cutting edge with the seam.

Figure 4:
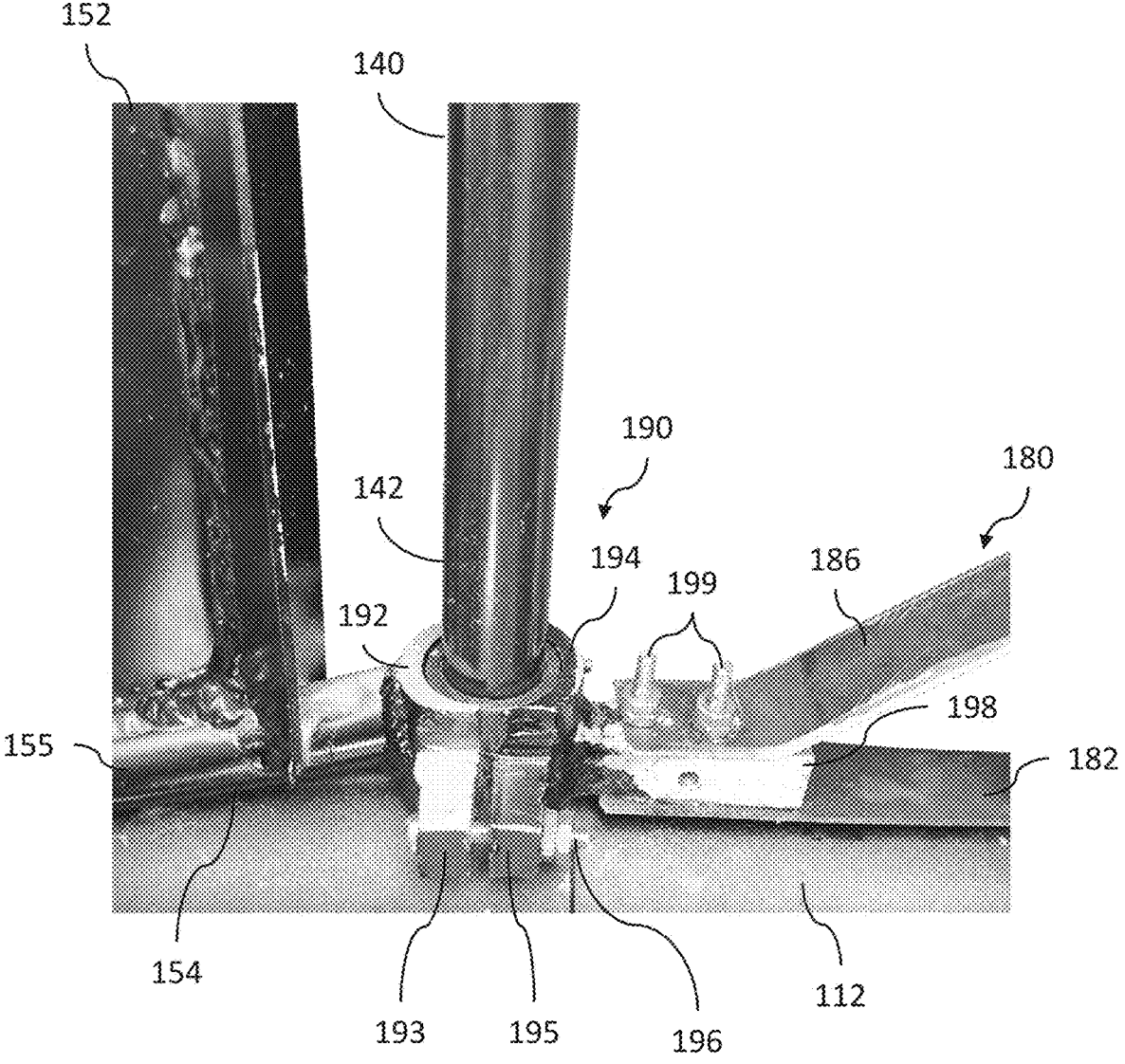
FIG. 4 depicts a bracket of the weed deflection device of FIG. 2, according to one or more embodiments shown and described herein.

In some embodiments, the weed deflection device 150 includes an optional bracket 190 which is generally concentrically mounted to the lower end 142 of down shaft 140 and may be disposed on top of the housing 112 of the motor unit 110. With reference to FIG. 4, the bracket 190 generally includes a first part 192 disposed on one side of the down shaft 140 and a second part 194 disposed on an opposite side of the down shaft 140. The first part 192 of the bracket 190 is coupled to the second part 194 such that the down shaft 140 is disposed or clamped between the first and second parts 192, 194.

The deflector plate 152 of the weed deflection device 150 is attached to the first part 192 of the bracket 190 and the cutting member 180 is attached to the second part 194. More particularly, the bottom frame member 155 or bottom edge 154 of the deflector plate 152 is attached to and extends outwardly from the first part 192 of the bracket 190. With respect to the cutting member 180, the first blade 182 or first cutting edge and the third blade 186 or third cutting edge are attached to and extend outwardly from the second part 194 of the bracket 190.

In some embodiments, the first and second parts 192, 194 of the bracket 190 are coupled to each other via a first flange 193, a second flange 195, and a fastener 196. More particularly, the first flange 193 extends outward from the first part 192 of the bracket 190 and the second flange 195 extends outward from the second part 194 of the bracket 190 in a manner generally parallel to the first flange 193. The fastener 196 extends between the first and second flanges 193, 195 and is tightened to couple the first part 192 of the bracket 190 to the second part 194. With the first and second parts 192, 194 being coupled, the bracket 190 is thereby securely mounted to the down shaft 140 with the deflector plate 152 disposed on one side of the down shaft 140 and the cutting member 180 disposed on the opposite side of the down shaft 140. It should be understood that while the first flange 193, second flange 195, and fastener 196 are shown and described with reference to one side of the bracket 190, the opposite side of the bracket 190 may include a similar arrangement of a first and second flange and a fastener.

In other embodiments, the first and second parts 192, 194 of the bracket are coupled to each other and the down shaft 140 via a snap mechanism (not shown). In alternate embodiments, an adjustable buckle (not shown) may be used to couple the first and second parts 192, 194 to each other and the down shaft 140.

In some embodiments, the second part 194 of the bracket 190 may include an attachment block 198 extending outward from the second part 194. The attachment block 198 is generally configured to provide a mounting platform for the cutting member 180 and to position the cutting member 180 adjacent to the propeller 120. In this regard, the first blade 182 may be mounted to a lower side of the attachment block 198 and the third blade 186 may be mounted to an upper side of the attachment block 198, with one or more fasteners 199 extending between the first blade 182, attachment block 198, and third blade 186.

Figure 5:
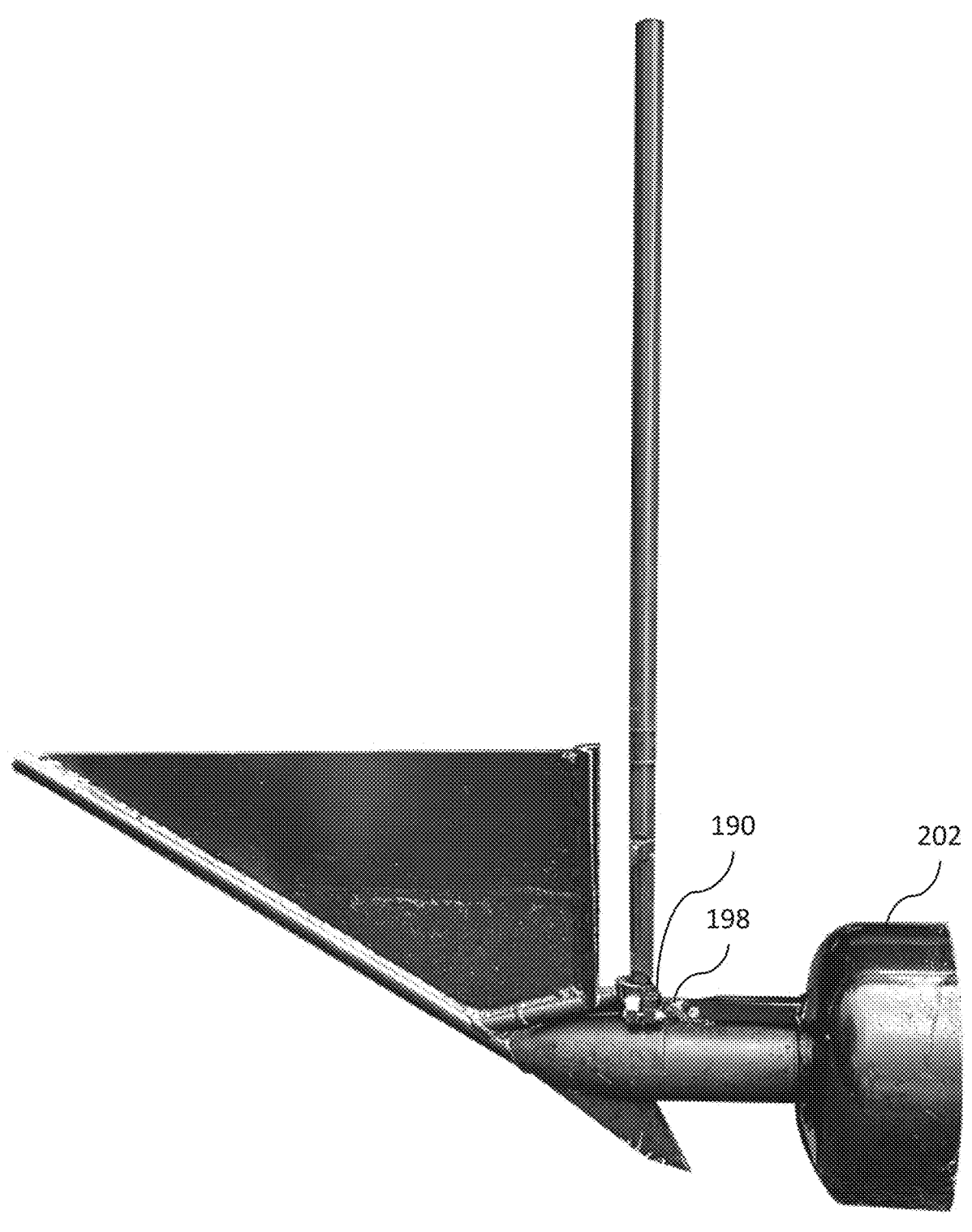
FIG. 5 depicts a weed deflection device that includes a shroud at least partially surrounding a propeller, according to one or more embodiments shown and described herein.

In some embodiments, with reference to FIG. 5, the attachment block 198 of the bracket 190 may be configured to provide a mounting platform for a propeller shroud 202 instead of or in addition to the cutting member 180. Using one or more fasteners, the propeller shroud 202 is mounted to and extends outward from the attachment block 198 and at least partially surrounds the propeller. In this regard, the propeller shroud 202 is generally configured to provide additional deflection of aquatic vegetation or other waterborne debris from the propeller.

In alternative aspects, a partial shroud (not shown) can be provided, for example, encompassing the top half of the propeller. In these embodiments, the exposed edges of the partial shroud can be sharpened thereby providing a blade that is capable of cutting any stray vegetation or debris near the propeller.

The bracket 190 is described above as being optional. In this regard, in some embodiments, the weed deflection device 150 may be integrally formed with the trolling motor 100 instead of being mounted to the trolling motor with the bracket 190. That is, the deflector plate 152 of the weed deflection device 150 may be integrally formed at one side of the down shaft 140 and the cutting member 180 may be integrally formed at an opposite side of the down shaft 140. For example, the deflector plate 152 and cutting member 180 may be integrally formed on at least one of the motor housing 112 or down shaft 140 at respective sides of the down shaft 140.

As described above, the trolling motor assembly 100 may be mounted via mount 146 to the bow or transom (i.e., stern) of the boat 102. While FIG. 1 generally illustrates mounting to the bow, it is contemplated that the trolling motor 100 can be mounted to the transom through use of a horizontal extension member (not shown) attached to or integrally formed with the boat mount 146. The horizontal extension member may be necessary to position the weed deflection device 150 rearward of the primary motor/propeller of the boat such that the deflector plate 152 does not contact/interfere with the primary motor/propeller or transom during operation of the trolling motor assembly 100. In this regard, the length of the horizontal extension member required to prevent the deflector plate 152 from interfering with the primary motor/propeller or transom of the boat may be increased or decreased based on the angle of deflection $A_d$ (see FIG. 2) at which the oblique front edge 160 or frame member 161 extends with respect to the waterline 106. For example, as the angle of deflection $A_d$ increases toward 180 degrees, the required length of the horizontal extension member would also increase. As the angle of deflection $A_d$ decreases toward 90 degrees, the required length of the horizontal extension member would also decrease. Moreover, it should be understood that in accordance with the embodiments disclosed herein, the angle of deflection $A_d$ between the waterline 106 and the oblique front edge 160 or frame member 161 can generally be configured as any angle greater than 90 degrees but less than 180 degrees.

The weed deflection device 150, including the deflector plate 152, cutting member 180, and optional bracket 190 may be formed from any material suitable for extended use in water or any material capable of being modified for extended use in water (e.g., plastics, polymers, metals, composites, alloys, carbon fiber, ceramics, etc.). In some embodiments, the deflector plate 152, cutting member 180, and bracket 190 may be made from the same, similar or different materials. For example, the deflector plate 152 and bracket 190 may be made of plastic while the cutting member 180 may be made of metal.

From the above, it is to be appreciated that defined herein is a weed deflection device for a trolling motor and/or a trolling motor formed with or otherwise including a weed deflection device which provides advantages over conventional trolling motor assemblies. For example, the majority of aquatic vegetation encountered by the weed deflection device is pushed out of the way of the propeller by the deflector plate, thereby preventing damage to the aquatic vegetation by the propeller. Furthermore, by keeping aquatic vegetation and other waterborne debris away from the propeller, the motor can run cooler and more efficiently. In addition, the deflector plate of the weed deflection device acts similar to a rudder, thereby increasing the steering responsiveness of the trolling motor.

It is also to be appreciated from the above that defined herein is a weed deflection device which is readily attachable to the down shaft of various makes and models of trolling motors through use of the optional bracket described above. Additionally, the weed deflection device defined herein contains simple shapes which are easily integrally formable with various makes and models of trolling motors.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A device for a trolling motor comprising:
   a deflector plate disposed on one side of a down shaft of the trolling motor, the deflector plate including a bottom edge that extends forwardly from the down shaft, an oblique front edge that extends forwardly and upwardly from one end of the bottom edge, a rear edge that extends upwardly from an opposite end of the bottom edge, a first angled leg that extends outward from the rear edge toward the down shaft in one direction, a second angled leg that extends outward from the rear edge toward the down shaft in another direction, and a top edge that extends between the oblique front edge and the rear edge; and
   a cutting member disposed on an opposite side of the down shaft, the cutting member including at least one cutting edge disposed adjacent to a location where a propeller of the trolling motor is mounted.

2. The device of claim 1, further comprising a bracket attached to the down shaft, the bracket including a first part and an opposite second part connected to the first part, wherein the deflector plate is attached to the first part and the cutting member is attached to the opposite second part, and wherein the down shaft is disposed between the first part and the opposite second part.

3. The device of claim 2, wherein the first part of the bracket is connected to the second part via a buckle or a snap mechanism.

4. The device of claim 1, wherein the deflector plate is integrally formed with the trolling motor at the one side of the down shaft and the cutting member is integrally formed with the trolling motor at the opposite side of the down shaft.

5. The device of claim 1, wherein the at least one cutting edge includes a horizontal cutting edge extending from the opposite side of the down shaft, an upward cutting edge extending from the horizontal cutting edge, and an oblique cutting edge extending downward from the upward cutting edge.

6. The device of claim 1, wherein the first and second angled legs define a V-shape with an open side that faces the down shaft and a closed side that faces the oblique front edge.

7. The device of claim 1, wherein the rear edge is horizontally spaced from the down shaft to define a gap between the rear edge and the down shaft.

8. A trolling motor comprising:
   a motor unit disposed on a lower end of a down shaft, wherein the motor unit includes a propeller and a motor housing with a nose piece and a tail piece;
   a deflector plate disposed on one side of the down shaft above the nose piece, the deflector plate including a bottom edge that extends forwardly from the down shaft, an oblique front edge that extends forwardly and upwardly from one end of the bottom edge, a rear edge that extends upwardly from an opposite end of the bottom edge, a first angled leg that extends outward from the rear edge toward the down shaft in one direction, a second angled leg that extends outward from the rear edge toward the down shaft in another direction, and a top edge that extends between the oblique front edge and the rear edge; and
   a cutting member disposed on an opposite side of the down shaft above the tail piece, the cutting member including at least one cutting edge disposed adjacent to a location on the tail piece where the propeller is mounted.

9. The trolling motor of claim 8, further comprising a bracket attached to the lower end of the down shaft above the motor housing, the bracket including a first part and an opposite second part connected to the first part, wherein the deflector plate is attached to the first part and the cutting member is attached to the opposite second part, and wherein the down shaft is disposed between the first part and the opposite second part.

10. The trolling motor of claim 8, wherein the deflector plate is integrally formed on at least one of the motor housing and down shaft at the one side of the down shaft and the cutting member is integrally formed on at least one of the motor housing and down shaft at the opposite side of the down shaft.

11. The trolling motor of claim 8, wherein the bottom edge of the deflector plate is disposed on top of the nose piece and is contoured to match an outer peripheral surface of the nose piece.

12. The trolling motor of claim 8, wherein the at least one cutting edge includes a horizontal cutting edge extending from the opposite side of the down shaft, an upward cutting edge extending from the horizontal cutting edge, and an oblique cutting edge extending downward from the upward cutting edge.

13. The trolling motor of claim 8, further comprising a skeg disposed on the motor housing, wherein a front edge of the skeg extends parallel to the oblique front edge of the deflector plate.

14. The trolling motor of claim 8, wherein one end of the oblique front edge terminates at a tip of the nose piece and the one end of the oblique front edge is contoured to match an outer peripheral surface of the tip of the nose piece.

15. The trolling motor of claim 8, wherein the rear edge is horizontally spaced from the down shaft to define a gap between the rear edge and the down shaft.

16. The trolling motor of claim 8, further comprising a shroud at least partially surrounding the propeller.

17. A device for a trolling motor comprising:

a bracket with a first part disposed on one side of a down shaft and a second part disposed on an opposite side of the down shaft, the first part being coupled to the second part such that the down shaft is disposed between the first and second parts;

a deflector plate mounted on the first part of the bracket, the deflector plate including a bottom frame member that extends forwardly from the first part of the bracket, a front frame member that extends obliquely upward from one end of the bottom frame member, a V-shaped rear frame member that extends upward from an opposite end of the bottom frame member, and a wall that extends between the bottom, front, and V-shaped rear frame members; and a cutting member mounted on the second part of the bracket, the cutting member including at least one blade disposed adjacent to a location where a propeller of the trolling motor is mounted.

18. The device of claim 17, wherein an open side of the V-shaped rear frame member faces the down shaft and a closed side of the V-shaped frame member faces the front frame member.

19. The device of claim 18, wherein the V-shaped rear frame member extends parallel to the down shaft and is horizontally spaced from the down shaft to define a gap between the open side of the V-shaped rear frame member and the down shaft.

20. The device of claim 17, wherein the at least one blade includes a first blade that extends horizontally from the second part of the bracket, a second blade that extends upwardly from the first blade, and a third blade that extends obliquely downward from the second blade.

* * * * *